FREQUENCY SHIFT SIGNALING SYSTEM

Filed Oct. 1, 1962 8 Sheets-Sheet 1

INVENTOR.
HARRY C. LIKEL
BY J. B. Burke
ATTORNEY $F_K$ = KEYING FREQUENCY

INVENTOR.
HARRY C. LIKEL
BY J. B. Burke
ATTORNEY

Sept. 7, 1965 H. C. LIKEL 3,205,441

FREQUENCY SHIFT SIGNALING SYSTEM

Filed Oct. 1, 1962 8 Sheets-Sheet 3

INVENTOR.
HARRY C. LIKEL

BY J. B. Burke

ATTORNEY

INVENTOR.
HARRY C. LIKEL
BY J. B. Burke
ATTORNEY

INVENTOR.
HARRY C. LIKEL
BY J. B. Burke
ATTORNEY

INVENTOR.
HARRY C. LIKEL
BY J. B. Burke
ATTORNEY

| | GATE OPEN | GATE CLOSED |
|---|---|---|
| INPUT PULSES PER SECOND | 1,536,000 | 1,228,800 |
| OUTPUT | PULSES PER SECOND | PULSES PER SECOND |
| 1ST BIN. DIV. | 768,000 | 614,200 |
| 2ND " " | 384,000 | 307,200 |
| 3RD " " | 192,000 | 153,600 |
| 4TH " " | 96,000 | 76,800 |
| 5TH " " | 48,000 | 38,400 |
| 6TH " " | 24,000 | 19,200 |
| 7TH " " | 12,000 | 9,600 |

INVENTOR.
HARRY C. LIKEL
BY J. B. Burke
ATTORNEY

INVENTOR.
HARRY C. LIKEL

BY J. B. Burke

ATTORNEY

United States Patent Office 3,205,441
Patented Sept. 7, 1965

3,205,441
FREQUENCY SHIFT SIGNALING SYSTEM
Harry C. Likel, Brooklyn, N.Y., assignor to The Western Union Telegraph Company, New York, N.Y., a corporation of New York
Filed Oct. 1, 1962, Ser. No. 227,345
7 Claims. (Cl. 325—163)

This invention concerns an improved frequency shift signaling system for transmission of binary signals employed in telegraphy, data transmission, telemetering, etc.

The objects of the invention are to provide a simplified transmission system providing continuous, coherent keyed signals; to minimize keying losses on shifting from one frequency to another; to provide keyed signals having the characteristics of frequnecy modulation signals; to include binary dividing chains for signals in a frequency signaling system; to provide a frequency shift signaling system having oscillators which need not remain in precise synchronism with each other at all times; to provide a frequency shift signaling system employing binary division techniques; to provide a frequency shift signaling system in which shifts between mark and space signal frequencies occur only at designated points in the two signaling frequencies which coincide in magnitude and phase; and to provide in a frequency shift signaling system, means for translating the frequency of a frequency shift keying modulated wave downward by frequency division, or means for translating the frequency of such a wave downward by frequency division and heterodyning in combination.

It has been conventional practice to obtain frequency shift of a carrier in a frequency shift signaling system, by altering the parameters and constants of an oscillator tank circuit in response to a keying signal. Difficulty has heretofore been encountered in such systems by the occurrence of unwanted transients in the carrier frequency due to the connection of uncharged increments of inductance or capacitance to the tank circuit. Also to avoid changes in operating frequency of the oscillator caused by changes in ambient and working temperatures, humidity, aging of components, etc., it has been necessary to provide specially designed, critical cricuit components.

Attempts were made in the prior art to avoid the complex design problems above mentioned and achieve a frequency shift signal by providing separate oscillators operated respectively at the two different frequencies required for frequency shift signaling, with means for switching from one oscillator to the other. Such systems had the inherent disadvantage that the switched outputs resulted in signal waves which were discontinuous, and non-coherent; that is the end of one signal frequency and the beginning of the other signal frequency at the instant of switching were not in phase. The resulting output wave on analysis exhibited the frequency spectrum of two 100% amplitude modulated waves, each modulated wave being at the frequency of the individual oscillators. Such operation did not bestow the benefits of frequency modulation. Also keying losses, that is losses of parts of mark and space signals were high due to the discontinuities incurred on switching the oscillators. It has not been found possible to provide any simple practicable way of keeping two oscillators in a switched frequency shift signaling system operating so stably that in-phase conditions repeat at a precise, constant rate so as to allow keying synchronously and precisely at instants of phase coincidence. Furthermore it has not been found practicable to provide a simple phase detector to activate keying exactly at the instants of phase coincidence and at the desired keying speed.

In an ideal frequency shift keying system, the signal output should change from one predetermined frequency to the other in response to the keying wave in continuous, coherent fashion. Such a signal output is a frequency modulated wave. The output consists of sideband frequencies separated by the keying frequency with amplitudes of the sidebands having Bessel function values for a frequency modulated wave.

According to the present invention a switched frequency shift keying system derived from a single fixed frequency oscillator is provided which generates a true frequency shift output signal. Such a system avoids the difficulties mentioned above of prior frequency shift signaling systems. The output signal remains continuous and coherent at all times. Circuitry design is simplified since operation is put substantially on a digital basis. The components of the system are less critical and the system requires less maintenance than prior systems.

One form of the invention may be employed in a synchronous or non-synchronous high speed data transmission system. Another form may be employed in a synchronous system alone. In a synchronous system transmission is at a fixed rate from the transmitter with which the receiver keeps in step. Stability of transmission is achieved through the use of an oscillator such as a crystal controlled oscillator, and an associated binary dividing chain which provides necessary timing pulses for the system. The combination of oscillator and dividing chain is known as a "clock." In one form of the invention the clock may have an output wave which is used to supply timing to a data signal source. This output wave may also be applied to a binary dividing chain. From this chain by one or more stages of binary division a square wave is derived having a repetition rate equal to the lower one of two predetermined frequencies of the frequency shift system. This square wave is rich in harmonics, so that a particular harmonic frequency may be selected by filtering. This harmonic frequency is a predetermined multiple of the lower frequency square wave. The harmonic frequency is amplified to the same amplitude as that of the lower frequency wave from which it is derived. The lower and higher frequency waves are locked in relative phase with each other. By switching between the lower and higher frequency waves at an instant of phase coincidence, an output wave is derived which is continuous and coherent. Such a wave has all the characteristics of the frequency modulated wave of an ideal frequency shift keying system mentioned above. The frequencies and timing are coordinated with the oscillator of the clock. Keying is synchronous and keying losses are minimized. Servicing of such a system is relatively simple.

In another form of the invention, two oscillators generating considerably higher frequencies than those required in the ultimate combined signal, are employed. The switched output of the oscillators is reduced by a suitable dividing chain. The output wave of the dividing chain is continuous and coherent regardless of the phase relationships of the two oscillator frequencies and the signaling wave at the instant of switching. If the oscillator frequencies are out of phase at the instant of switching keying losses occur but these are minimized by providing a multiplicity of dividing steps in the divider chain beyond the point of switching. A system embodying this form of the invention may employ two separate oscillators or may employ filters to select harmonics of a wave from a single oscillator to arrive at the certain desired frequencies or may employ feedback dividers for the same purpose.

In any case the number of cycles per second separation between the desired mark and space frequencies is arrived at after sufficient stages of frequency division beyond the point of keying and considerably above the final frequencies required. This is done so that the square waves produced in the system may be reduced to sine waves without destroying the sideband content of the signal. Then by modulation (heterodyning) the sine wave signals are translated to the desired position in the frequency spectrum.

The invention will be best understood frm the following detailed description taken together with the drawings, wherein:

FIG. 1 is a block diagram of one system according to the invention;

FIGS. 2, 3, and 4, are graphical representations of waveforms used in explaining this system;

Figure 3:
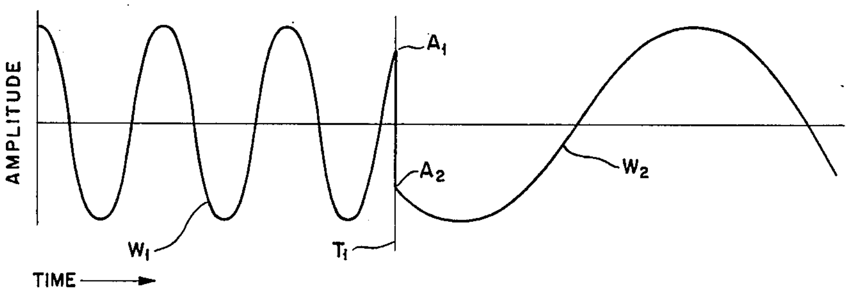
Figure 3A:
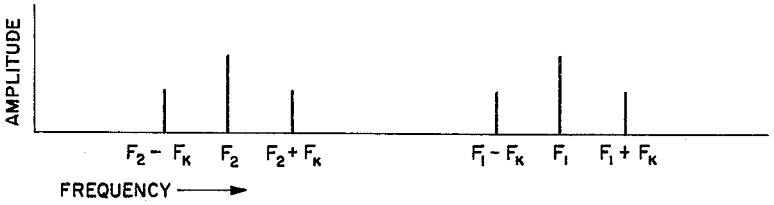

Referring first to FIG. 3, there is shown graphically the waveform of the output of a keying system in which separate oscillators are employed, having sine wave voltage outputs $W_1$ and $W_2$. The system is switched from one oscillator to the other in response to a keying signal at time $T_1$. It will be noted that amplitude changes instantaneously from $A_1$ to $A_2$. This introduces a discontinuity in the waveform giving it the characteristic of amplitude modulation of the two separate frequencies. FIG. 3A shows graphically the frequency spectrum of the total waveform $W_1$, $W_2$. The waveform is that of two 100% amplitude modulated waves at the frequencies of the respective oscillators. Wave $W_1$ has two side bands, $F_1-F_k$ and $F_1+F_k$, where $F_k$ is the keying frequency and $F_1$ is the frequency of wave $W_1$. Wave $W_2$ has two side bands, $F_2-F_k$ and $F_2+F_k$ where $F_2$ is the frequency of wave $W_2$.

In an ideal frequency shift keying system this discontinuity in the output wave will not exist. The waveform of the output of a frequency shift keying system will appear as illustrated graphically in FIG. 4. The sine wave output $W'$ of frequency $F_1$ changes to sine wave output $W''$ of frequency $F_2$ at time $T'$ in response to application of a keying signal to the system. The change from one frequency to the other is instantaneous and in phase so that no distorting transient pulse is introduced. Thus amplitude $A'$ at time $T'$ is the same for wave $W'$ as it is for wave $W''$. This continuous or coherent wave $W'$, $W''$ has inherent characteristics of a frequency modulated wave, as illustrated in FIG. 4A. The center frequency is $F_O$.

$$F_O=\frac{F_1+F_2}{2}$$

where $F'_1$ and $F'_2$ are frequencies of waves $W'$, $W''$ respectively. The side bands, or frequency components, $F_a$, $F_b$, $F_c$ and $F_{a'}$, $F_{b'}$, $F_{c'}$ of the wave W, W', illustrated, are separated from $F_O$ and from one another by the keying frequency $F_k$, and their amplitudes correspond in magnitude to Bessel's function values for such a frequency modulated wave.

Figure 4:
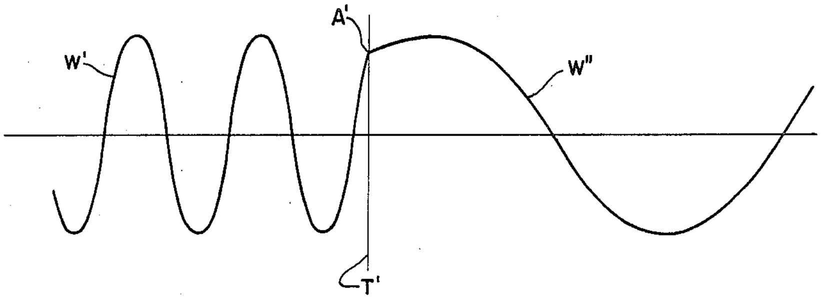
FIGS. 3A and 4A are graphical representations of signal components of the waveforms of FIGS. 3 and 4, respectively.
Figure 4A:
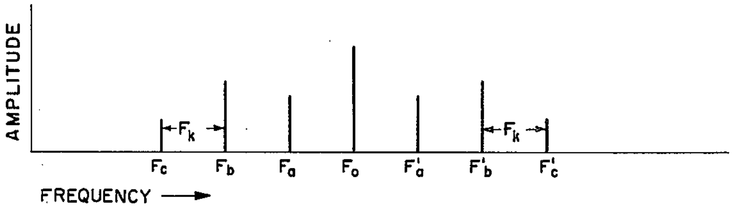

It has not been found possible heretofore to construct a frequency shift keying system in which the output waveform would be continuous and coherent, as illustrated in FIG. 4, without resort to rather complex circuits which would minimize the transient pulses introduced during keying. Such complex circuits are difficult and expensive to construct and maintain in precise adjustment.

Figure 1:
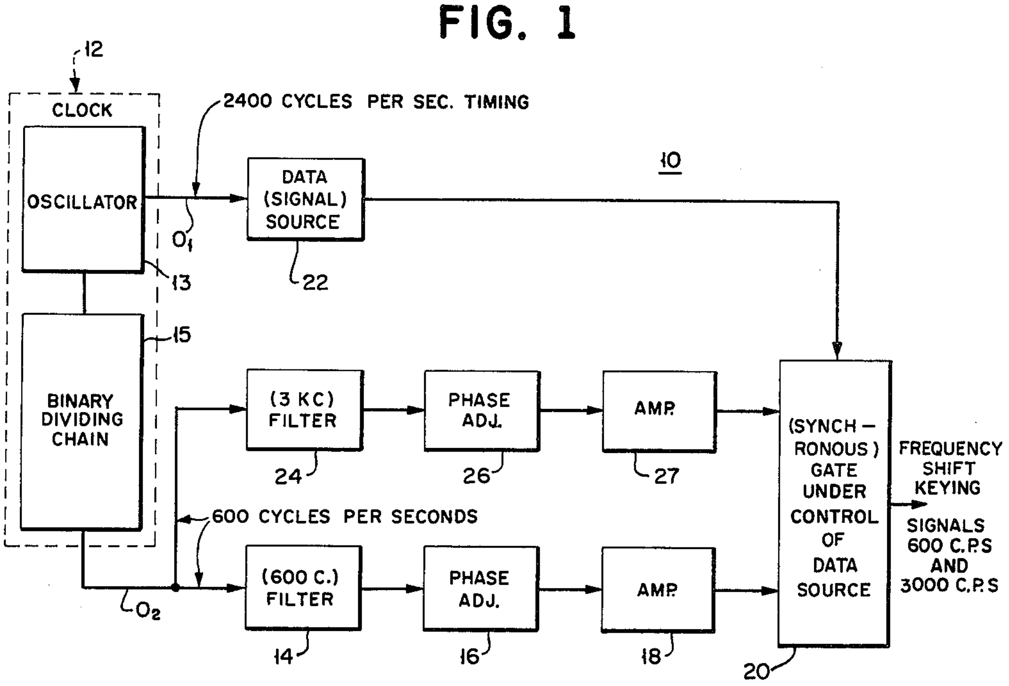

FIG. 1 illustrates a basic form of system according to the invention, which produces continuous, coherent frequency-shifted signals having an ideal waveform.

The system 10 of FIG. 1 includes a clock 12 which is a stable source of pulses at fixed rates. The clock may include a stable crystal oscillator 13 producing a wave output at a fixed frequency and a binary dividing chain 15 which produces timing pulses for the system from the output of the crystal oscillator. It is assumed, for the purpose of explanation, that the clock output $O_1$ is at the rate of 2400 cycles per seconds. The clock may also have a square wave output $O_2$ of 600 cycles per second produced by binary division of the 2400 cycles per second wave. The 600 cycles per second square wave is applied to a filter 14 which extracts the 600 cycles per second fundamental sine wave and applies it via a phase adjuster 16 and amplifier 18 to a gate circuit 20 under control of a data signal source 22. The 600 cycles per second square wave is rich in odd harmonics and is further applied to a filter 24 which extracts a 3000 cycles per second sine wave, which is the fifth harmonic of the 600 cycles per second fundamental wave, and applies it via another phase adjuster 26 and amplifier 27 to the gate circuit 20. The 2400 cycles per second wave is also applied to the data signal source 22 which actuates gate 20. The gate will pass signals at 600 cycles per second or at 3000 cycles per second when keyed by the data signal source.

Figure 2:
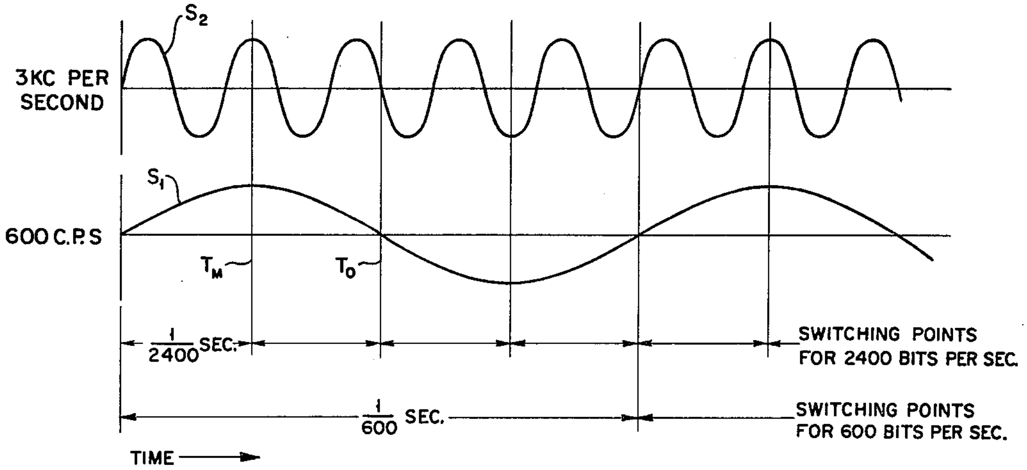

FIG. 2 shows waveform $S_2$ having a frequency of 3000 cycles per second derived by filter 24, and waveform $S_1$ having a frequency of 600 cycles per second derived by filter 14. The waves are in phase after adjustment by phase adjusters 16 and 26. One cycle of wave $S_1$ exactly equals five cycles of wave $S_2$, and the waves have zero and maximum amplitudes simultaneously at times $T_O$ and $T_M$. Since the waves $S_1$ and $S_2$ and the timing waves to the data source which controls its instant of changing from mark to space are derived from the same oscillator 12, they can be adjusted in phase relative to each other as they leave the filters 16, 26 so that both waves are exactly in phase in their respective cycles when switching takes place from one wave to the other in gate circuit 20. The amplifiers 18 and 27 amplify the waves $S_1$ and $S_2$.

Figure 11:
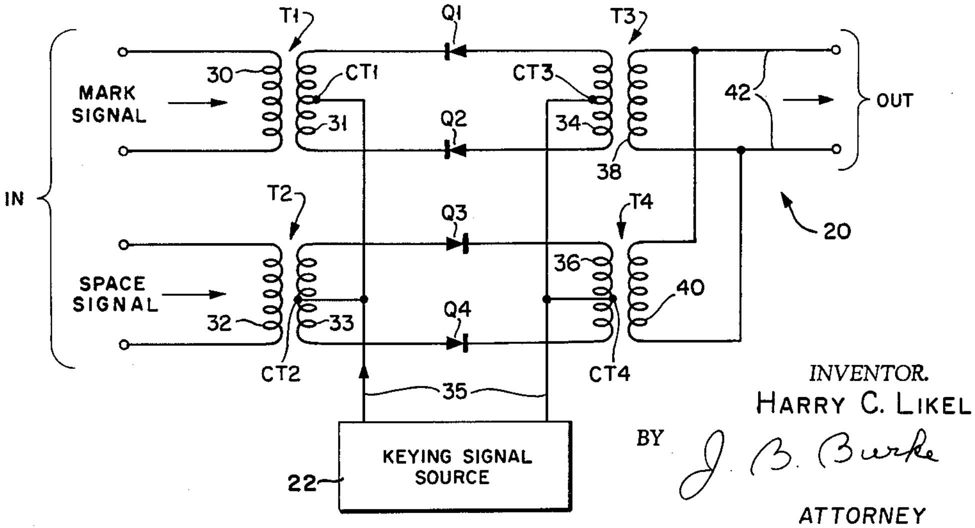
FIG. 11 is a diagram of a gate circuit which may be used in the systems of FIGS. 1, 6, 8 and 9, 13–15.

FIG. 11 shows a diagram of the gate circuit 20. This circuit has input transformers T1, T2 and output transformers T3, T4. Connections between the input and output transformers are made through suitable diodes $Q_1$, $Q_2$, $Q_3$ and $Q_4$. Transformer T1 has a primary 30 to which the mark signal frequency S1 is applied. Transformer T2 has a primary 32 to which space signal frequency S2 is applied. The secondaries 31, 33 of the transformers are respectively connected to primaries 34, 36 of transformers T3, T4. The square wave polar keying signals derived from signal source 22 are applied via line 35 in parallel to center taps CT1–CT4 of the several secondaries and primaries 31, 33 and 34, 36. The secondaries 38, 40 of the output transformers are connected in parallel to the output line 42. In response to the applied keying signal on line 35, there is derived at output line 42 mark or space signals frequencies as a result of the keying signal making the diodes in the mark circuit or the space circuit conducting and those in the other circuit non-conducting.

The frequency shifted wave output derived from the gate circuit 20 in system 10 has the ideal, continuous characteristic, such as shown in general form in FIG. 4. This ideal form of wave has been achieved by a novel system without incurring design problems heretofore encountered in conventional keyed frequency shift oscillators. Frequencies of the waves $S_1$ and $S_2$ are determined entirely by a single crystal oscillator in the clock 12. Keying is entirely synchronous between the two waves since both derive from the same source so that no discontinuities are introduced.

The system 10 of FIG. 1 has the limitation that the low and high frequencies $S_1$ and $S_2$ used to generate the frequency shift wave are limited to frequencies that can be derived from the clock frequencies by a combination of harmonic selection and division. Also signaling can only take place at rates at which instants of phase correspondence in $S_1$ and $S_2$ repeat. If other frequencies are required for $S_1$ and $S_2$, then a system such as illustrated in FIG. 6 may be used.

Figure 6:
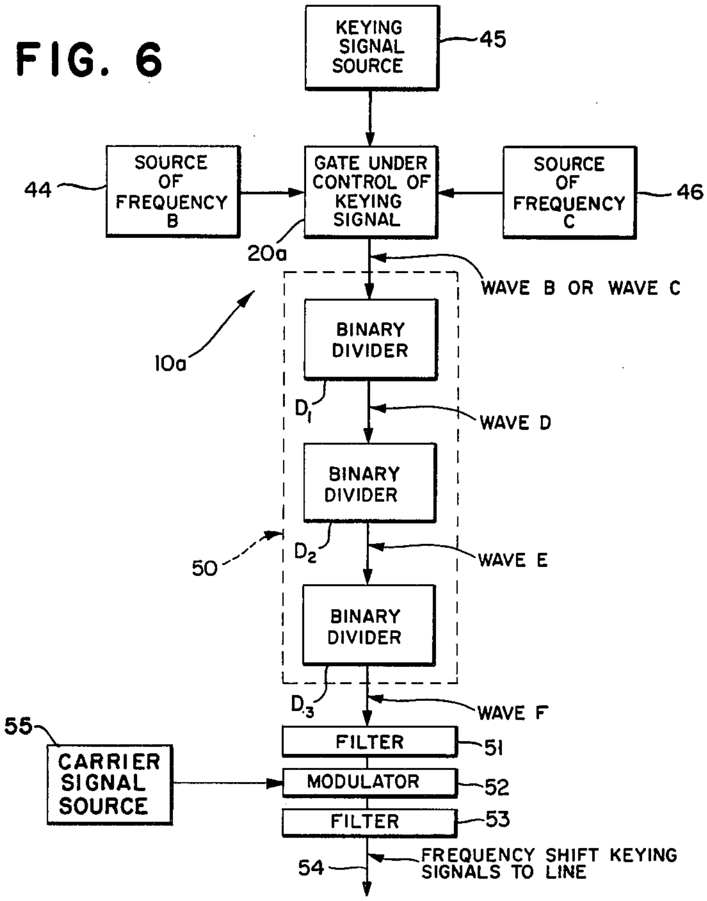
FIGS. 6, 8, 9, 13, 14, 15 are block diagrams of several other systems according to the invention.

The system 10*a* shown in FIG. 6 has sources 44, 46 of two different signal frequencies B and C connected to a gate circuit 20*a* similar to gate 20 shown in FIG. 11. The keying signal source 45, which needs bear no frequency or phase relationship to the oscillator frequencies B and C, applies a signal A to the gate circuit 20*a*. The output of the gate circuit is applied to a chain 50 of sequentially connected binary dividers $D_1$, $D_2$, and $D_3$.

A filter 51 is connected to the output of chain 50. This filter converts the output signals of the chain to sine waveform. Modulator 52 is connected to filter 51 and heterodynes the sine wave signals with a carrier frequency supplied by a carrier signal source 55 to produce a sideband having two desired keying frequency components. Another filter 53 is connected between modulator 52 and output line 54 for selectively passing the two desired keying frequencies to the line.

Figure 5:
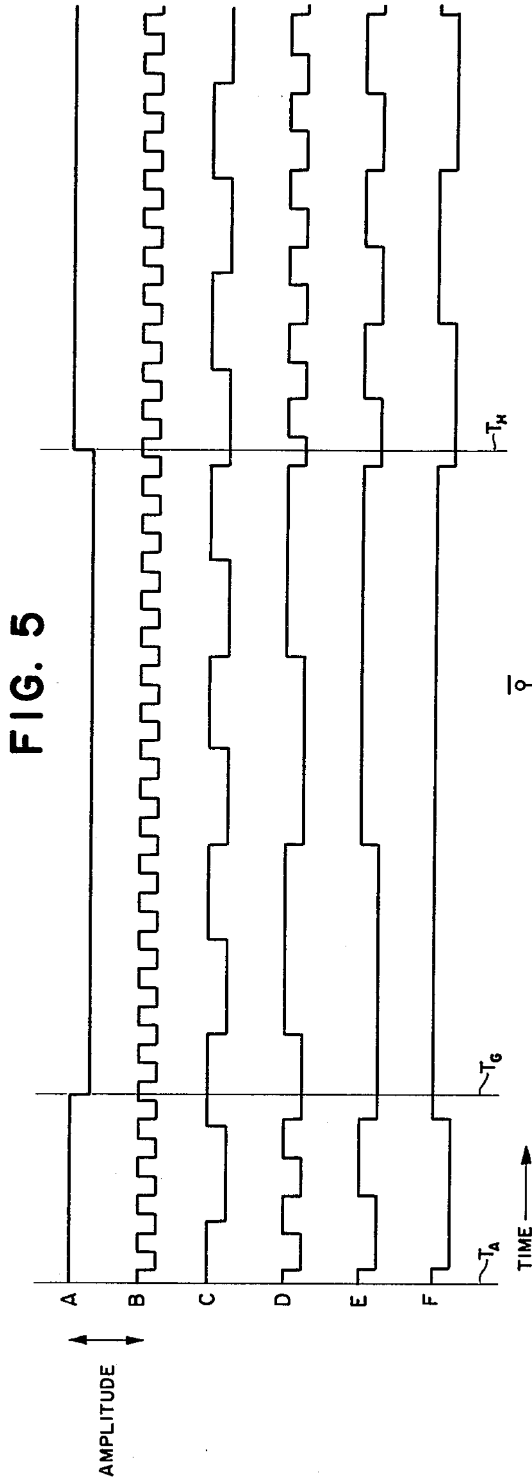
FIG. 5 is a wave diagram used in explaining FIG. 6.

FIG. 5 illustrates graphically the operation of system 10*a*. Operation is based upon the use of oscillators in signal sources 44, 46, which have considerably higher frequencies than those wanted in the combined signal, and by reducing the switched output of the two signal sources to desired frequencies in the dividing chain. These frequencies may be ones suitable for reduction to sine waves by filter 51 and further reduction in frequency by modulation in modulator 52. The keying signal output of source 45 is shown as a square wave A in FIG. 5. Signals B and C, which are supplied by sources 44, 46 respectively, are also square waves. As illustrated in FIG. 5 wave B has five times the frequency of wave C but the ratio may be any required to give the desired final frequencies. Times $T_G$ and $T_H$ are instants of changeover of the keying signal and they may occur at random. The waves A, B and C need not be in phase with each other and are shown at random phase. From time $T_A$ to time $T_G$, gate 20*a* passes signal B to the dividing chain 50. From time $T_G$ to time $T_H$ gate 20*a* passes signal C. After time $T_H$ the gate passes signal B again and so on, with signal B and signal C alternately being passed from the gate to the chain 50. The output of the first binary divider $D_1$ is shown by wave D. This divider and the dividers $D_2$ and $D_3$ are assumed to be reversing on downward crossovers of the applied waves. At instant $T_G$ both waves B and C are in positive phase when the output to the chain is switched by the gate 20*a* from wave B to wave C. The half-cycles of wave D are longer when controlled by wave C than when controlled by wave B. At instant $T_H$, the waves B and C are in opposite phase. After control of the divider chain 50 shifts from wave C to wave B, wave D develops shorter half-cycles than are developed while under control of wave C. It will be noted that because of the phase relationship existing between wave B and wave C at instants $T_G$ and $T_H$, half cycles are produced in wave D that were not one cycle of either wave B or C in length. The output waves E and F are produced by dividers $D_2$ and $D_3$ respectively. It will be noted that wave F has half-cycles which are more nearly correct in length at each changeover point than they are in waves D and E. The divider chain shold have many more divider stages than the three indicated in FIG. 6 if waves B and C were of much higher frequency than wave A. The lengths of the half-cycle in the final output wave of the divider chain will be characteristic of the controlling frequency with the distortion at crossover becoming vanishingly small, because the displacement of the crossovers from the true position remains fixed while the cycles become longer and longer with each stage of division of the wave. This final output wave will exhibit the properties of a continuous coherent wave with very small keying loss. It has been found by applying the output of a chain similar to chain 50 to a wave analyzer that the wave output F has frequency components corresponding to those of a frequency modulated wave.

If wave A is 200 cycles per second and waves B and C are 2000 cycles per second and 900 cycles per second respectively then the output of the divider chain would have a component of 1450 cycles per second, and other components spaced 200 cycles per second apart and disposed symmetrically with respect to the component of 1450 cycles per second. These components will have Bessel's function amplitude values corresponding to that of a wave of 1450 cycles per second modulated by a square wave at the rate of 200 cycles per second with a shift of $\pm 550$ cycles per second. Thus by use of many dividers in the chain 50, it becomes possible to obtain continuous, coherent frequency modulated, frequency-shift wave regardless of the difference in phase relationships between frequencies B and C produced by sources 44, 46 and between the keying signal of source 45 and frequencies B and C. In prior systems which did not use frequency division, as pointed out above, any difference in phase between the output waves of the two oscillators resulted in a discontinuous final wave such as illustrated in FIG. 3. This wave did not represent frequency shift modulation or give the benefits associated with frequency modulation.

The system 10*a* of FIG. 6 thus provides a way of producing continuous, coherent frequency-shifted waves regardless of the differences in phase relationships of the waves produced by the keying signal source 45, and the oscillators of signal sources 44, 46. The oscillators and keying signals therefore need not be coordinated or synchronized. This non-synchronous arrangement greatly simplifies design and construction problems, permits flexibility in choice of components, and facilitates installation and servicing, at the same time improved performance of the transmission system is attained, since the frequency-shifted output signal is substantially coherent and without distortion.

Figure 8:
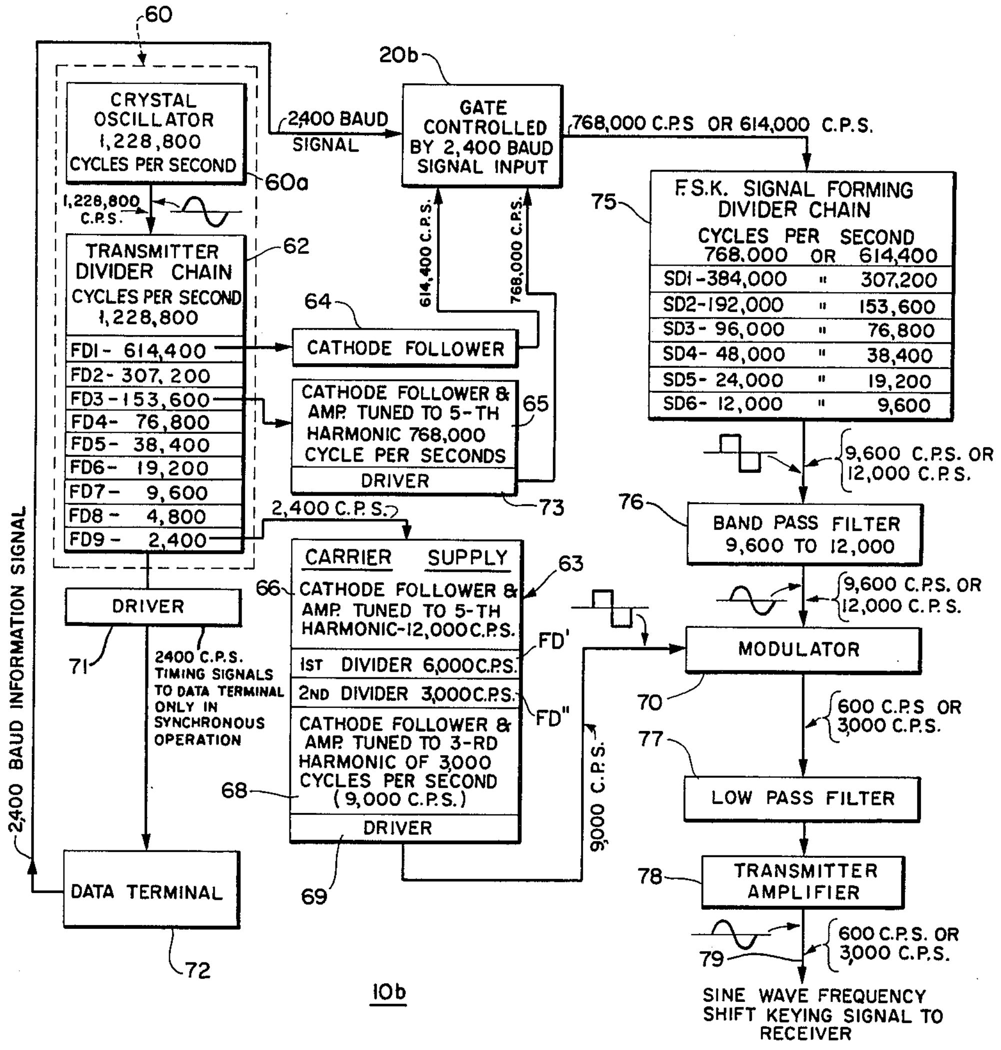

FIG. 8 shows a digital transmitter system 10*b*, according to the invention, in which a single stable source 60 of a clock signal is employed. This source includes a crystal oscillator 60A which is connected to a binary divider chain 62 including a series of frequency dividers FD1–FD9. A high input impedance amplifier such as a cathode follower 64 is connected to the first binary divider FD1. Another high input impedance amplifier such as cathode follower 65 with adidtional tuned stages is connected to a divider FD3 in chain 62. A carrier supply circuit 63 is connected to a divider FD9 in chain in the chain 62. Circuit 63 includes a cathode follower type of amplifier 66 with additional tuned stages, frequency dividers FD′, FD″, and another cathode follower type of amplifier with additional tuned stages 68. The output of amplifier 68 is applied via driver amplifier 69 to a modulator 70. If it is desired that the transmission system be a synchronous one, the output of chain 62 is applied via driver amplifier 71 to data terminal 72 to provide timing pulses to cause terminal 72 to operate at a desired rate, shown in FIG. 8 as 2400 bauds. For non-synchronous operation driver amplifier 71 may be omitted. In any event the data terminal 72 is connected to and drives gate 20*b*, which is similar to gate 20 shown in FIG. 11. The output of cathode follower 64 is applied to one input of gate 20*b*. The output of cathode follower and tuned amplifier 65 is applied via driver amplifier 73 to another input of gate 20*b*. The output of gate 20*b* is applied to a chain 75 of six binary dividers SD1–SD6. The output of chain 75 is connected to a bandpass filter 76. The output of the filter is connected to modulator 70. A low-pass filter 77 is connected to modulator 70. The output of filter 77 is applied to the input of amplifier 78. The output of amplifier 78 is applied to transmission line 79. The desired frequency-shifted signal appears on line 79.

The arrangement of system **10*b*** involves one specific embodiment of the invention operable at 2400 bauds. This pulse rate is selected for illustrative purposes only. It should be clearly understood that operation at other system or pulse rates will require components operating at frequencies other than those indicated in FIG. 8.

In the system **10*b***, the principal object is to provide a frequency shift keying signal transmission system suitable for operation at 2400 bauds. This particular system is based on the use of but one oscillator as a single signal source of fixed frequency. Through the use of frequency division methods and the proper selection of harmonics, this single signal is made to provide all the various frequencies needed. The system would work if each of the basic needed frequencies, i.e., 768,000 cycles per second; 614,400 cycles per second, 9000 cycles per second, and in the case of a synchronous system 2400 cycles per second, had been supplied by separate oscillators; but the system would then be without the advantage of absolutely fixed relationships between the several frequencies.

As shown in FIG. 8 the single signal source of fixed frequency is crystal oscillator 60, operating at a frequency of 12,228,800 cycles per second. This frequency is fed to the transmitter divider chain 62 which has nine stages of binary division reducing the input frequency to 2400 cycles per second.

A tap is taken from the output of the first stage of binary division FD4 by means of amplifier 64. The frequency at this point is 614,400 cycles per second which may have a square waveform, and is applied from the output of amplifier 64 to gate **20*b*. A similar tap is connected from the output of the third stage of binary division FO3 to amplifier 65. The frequency applied is 153,600 cycles per second. This amplifier 65 is tuned and selectively amplifies the fifth harmonic of 153,600 cycles per second that is 768,000 cycles per second. This new frequency of 768,00 cycles per second is then squared in a driver stage 73 and made similar in character, except for frequency, to the output of amplifier 64. It is then applied to gate 20*b*. Gate 20*b* may be similar to the gate 20 of FIG. 11 already described. Thus the output of gate 20*b* will be one or the other of these two frequencies (768,000 c.p.s. or 614,400 c.p.s.) depending upon whether the controlling signal from data terminal 72** is marking or spacing.

The output of gate **20*b* is applied to signal divider chain 75 which has six stages of binary division SD1–SD6 and therefore divides by sixty four. The keying loss due to random control of gate 20*b* by the data signal will be divided by 64 at the output of signal divider chain 75. If a greater reduction in keying loss is required it is only necessary to increase the frequency of the crystal oscillator 60 by any power of two and add a similar number to the power used, of stages of division to transmitter divider chain 62 and signal divider chain 75**.

Thus if the crystal oscillator frequency is raised by the second power of two, that is multiplied by four it becomes 4,915,200 cycles per second. Then the two frequencies fed to gate **20*b* and in turn signal divider chain 75 will be 2,457,600 cycles per second and 3,072,000 cycles per second respectively. Adding two stages of division to the signal divider chain 75** will make it divide by 256 instead of by 64 as formerly and the two new input frequencies will be reduced to 9600 cycles per second and 12,000 cycles per second as before. However, the keying loss at the input will now be reduced by a factor of 256 which demonstrates that as nearly perfect a signal as may be desired can be arrived by this method without necessarily resorting to synchronous keying.

The output wave of signal divider chain 75 when keyed at the 2400 baud rate will be found to consist of a carrier frequency of 10,800 cycles per second and upper and lower sidebands consisting of frequencies separated from the carrier by plus and minus 1200 cycles per second. The first order sidebands frequencies will be 9600 cycles per second and 12,000 cycles per second. It has been found that a satisfactory frequency shift keying signal results if only the first order sidebands are transmitted, so that a great conservation of frequency spectrum in transmission is thereby accomplished and other advantages are obtained.

The output of signal divider chain 75 is passed through band pass filter 76. The characteristics of this filter are such that the carrier frequency and first order sidebands are passed without discrimination while the higher and lower frequencies in the applied wave are highly discriminated against. The output of filter 76 then must be an FSK sine wave signal.

The output of transmitter timing divider chain 62 may serve two additional purposes. One: If it is desired to operate the system on a synchronous basis, timing signals for stepping the bits out of the data terminal 72 and other needed purposes may be obtained from it. Two: A tap is taken off divider FD9 at the 2400 cycles per second frequency and its fifth harmonic 12,000 cycles per second is obtained in tuned amplifier 66. This output of 12,000 cycles per second is then operated on by two stages of binary division FD′ and FD″ to reduce it to 3000 cycles per seconds, whence the third harmonic, in this instance 9000 cycles per second is selected, amplified and squared to a form suitable for use as the carrier or heterodyning frequency in modulator 70. The modulator will then produce side bands of 9000 cycles per second plus and minus the signal frequency applied by the band pass filter. The output of modulator 70 is applied to low pass filter 77 which is designed so as to pass only the lower side band, that is 600 cycles per second or 3000 cycles per second. As was explained earlier, when the data signal is not standing on mark or space but causing modulation, a carrier frequency will appear midway, between a given pair of sideband frequencies, such as 600 cycles per second and 3000 cycles per second, that is at 1800 cycles per second. Thus by the above method a sine wave frequency shift keying signal has been developed which is suitable for transmission over a "voice band." This signal has been entirely derived from the output of one fixed frequency oscillator and the signal to be transmitted. The same method could be used to develop signals with other frequencies and in other parts of the frequency spectrum.

Figure 9:
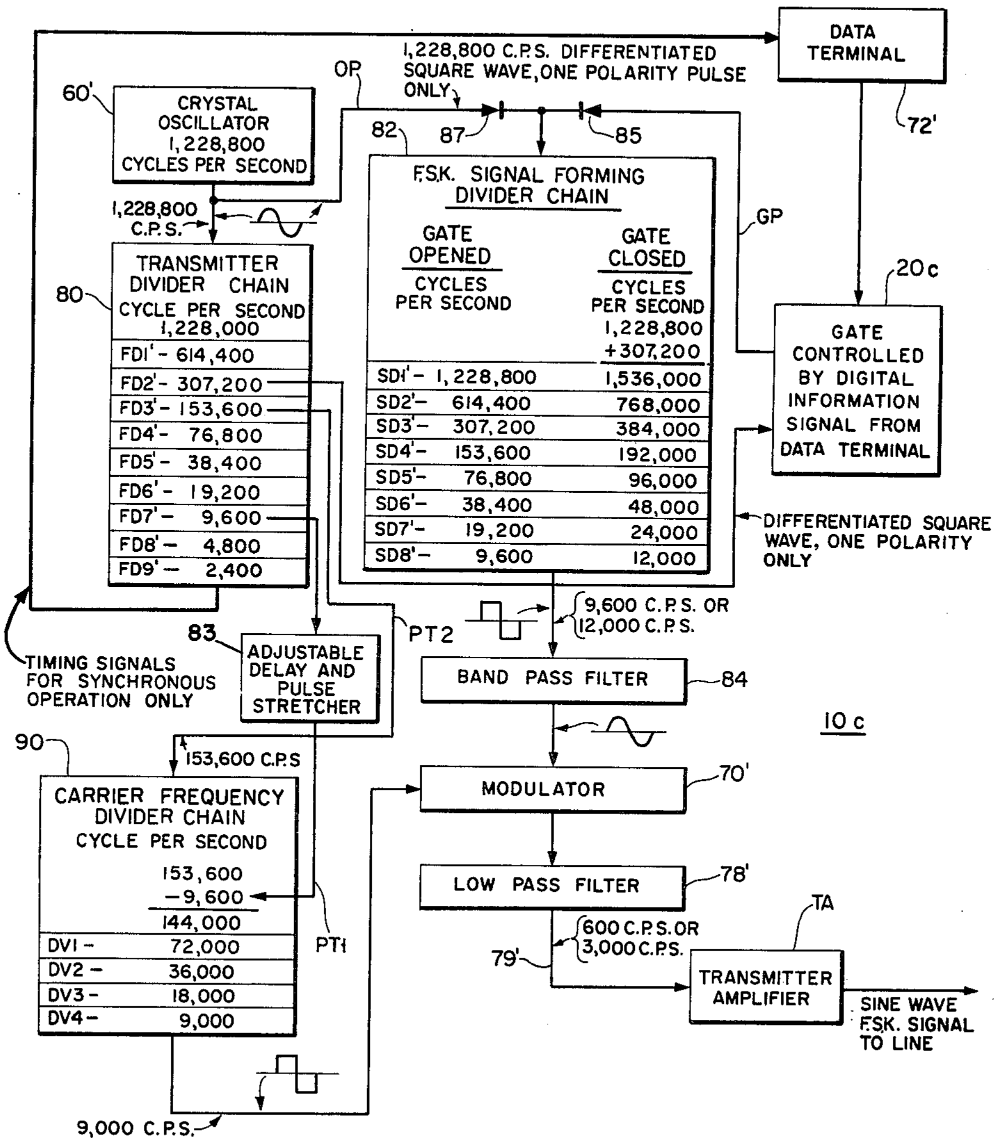

FIG. 9 shows another digital transmitter system **10*c*, according to the invention, in which a single stable source 60′ is employed. A crystal oscillator in source 60′ provides a fixed frequency to drive a binary divider chain 80, including a series of frequency dividers FD1′–FD9′. The oscillator in source 60′ also drives a frequency-modulated signal-forming divider chain 82, including another series of dividers. Gate 20*c* is controlled by signals derived from a source of data signals 72′. The output of timing chain 80 may be applied to supply timing signals if synchronous operation is required. The output of chain 82 is applied in succession to a bandpass filter 84, then to a modulator 70′ and low pass filter 78′. The output of filter 78′ applied to line 79′** and transmitter amplifier T*a* is the desired frequency-shift signal.

A carrier frequency divider chain 90 has four divider stages DV1–DV4. Divider DV1 has two inputs. One input is taken from divider FD3′. The other input is taken from divider FD7′ via an adjustable delay and pulse stretcher circuit 83. The low frequency output of divider DV4 is connected to modulator 70′. A unipolar pulse train derived from a differentiated square wave is applied from divider FD2′ in chain 80 to gate **20*c*. Gate 20*c* is connected via a diode rectifier 85 to the input of chain 82. Oscillator 60' is also connected to the input of chain 82 via a diode rectifier 87**.

The system 10c of FIG. 9 operates in a different manner from that of system 10b, but accomplishes similar results. Crystal oscillator 60' is a source of single fixed frequency from which all frequencies required are derived. In the example illustrated in the drawing, the oscillator operates at 1,228,800 cycles per second. It drives transmitter divider chain 80 which divides the applied frequency down to 2400 cycles per second or 1200 cycles per second whichever is required to time the data terminal if the system is to be a synchronous one. If non-synchronous operation is to be used, it need only divide the frequency down to 9600 cycles per second.

The output of crystal oscillator 60' is also fed to frequency shift keying signal forming divider chain 82 and drives it continuously. An output is taken from the transmitter divider chain 80 of 307,200 cycles per second and is passed through gate 20c controlled by the digital information signal. This gate may be similar to part of the gate shown in FIG. 11 or any one of a number of other suitable forms well known to the art. The pulse output of gate 20c is made unipolar by diode 85 and is then added to the pulse output of the crystal oscillator applied to chain 82 to form a new frequency which is the sum of the two (1,228,800+307,200), namely 1,536,000 cycles per second. This is shown diagrammatically in the box of chain 82 in FIG. 9. The delay in the transmitter divider chain 80 and the gate 20c is assumed to be such that the pulses derived via gate 20c and those coming directly from the oscillator 60' are separated in time sufficiently so as to act separately on the FSK signal forming chain 82. If this did not prove to be the case the necessary delay to bring this about could easily be accomplished by inserting a time delay circuit in either path OP or GP leading to diodes 85 or 87. These diodes eliminate pulses of unwanted polarity making it easier to interleave the pulses from the two paths OP and GP. They also prevent any of the energy of a pulse from being absorbed by the other path so that each pulse is fully effective on the first divider of the FSK signal forming chain 82.

The two columns of numbers shown in the box of frequency shift keying signal forming divider chain 82 represent the frequencies that will be found at the input and at each succeeding stage of each divider SD1–SD8 depending upon whether the gate 20c is open or closed. As will be noted the output frequencies of the FSK signal formed from them under the two conditions are the same as those obtained by the method of system 10b.

Figure 10:
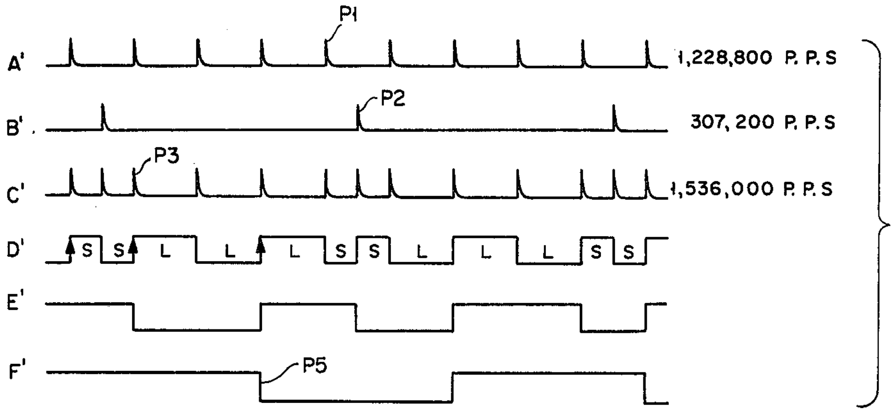
FIG. 10 shows pulse diagrams used in explaining operation of the system of FIG. 9.

FIG. 10 shows a series of diagrams A'–F'. Diagram A' represents equally spaced pulses P1 applied to divider SD' from oscillator 60'. Diagram B' represents equally spaced pulses P2 derived from gate 20c. Diagram C represents pulses P3 which are the sum of pulses P1 and P2 and which are applied to the input of chain 82, that is to divider SD1'. Diagrams D', E', and F' represent waves derived from dividers SD1', SD2' and SD3' respectively.

It will be noted from FIG. 10 that the application of the series of non-uniformly spaced stepping pulses P3 spaced as shown in diagram C' to binary divider stage SD' results in non-uniformly spaced crossovers of wave D'. However as shown by the substantially equal length of the half cycles in diagram F', this lack of uniformity disappears in the third stage of division. Also keying loss will become progressively smaller with each additional stage of division down through divider SD8'.

To complete operation of the system it is necessary to supply a 9000 cycles per second carrier frequency. This is obtained from divider DV5 of carrier frequency chain 90. This chain is fed by two frequencies from the transmitter divider chain 80. The first of these is 153,600 pulses per second and the second is 9600 pulses per second. Before combining the pulses of the two series, the pulses at 9600 pulses per second are passed through an adjustable time delay circuit 83 so that the pulses of the two series will arrive at the carrier frequency chain at the same instant. The pulses at the 9600 pulses per second rate are made to act on the divider circuit DV1 in opposition to the pulses at 153,600 pulses per second so that each time one of the pulses at 9600 pulses per second appears the chain will fail to step. The effective input frequency to the chain is thus in this case 144,000 pulses per second (153,600 p.p.s.–9600 p.p.s.).

The above result may be brought about by making the pulses from the 9600 p.p.s. path PT1 of opposite polarity and somewhat stronger than the pulses from the 153,600 pulses per second path PT2. Thus each time a pulse appears from path PT1 it will cancel the pulse arriving by path PT2. To make adjustment of the circuit less critical, a pulse stretcher may be added to circuit 83 for broadening the pulses in the 9600 pulses per second path PT1.

The effective input frequency of 144,000 cycles per second at chain 90 will be divided by 16 in the four binary stages DV1–DV4 and will emerge as a square wave of 9000 c.p.s. This is applied to the modulator 70'.

Yet another method of operating an FSK signal forming chain is through the use of a feedback type of divider with a gate controlled by the digital data signal in the feedback circuit.

Figure 12:
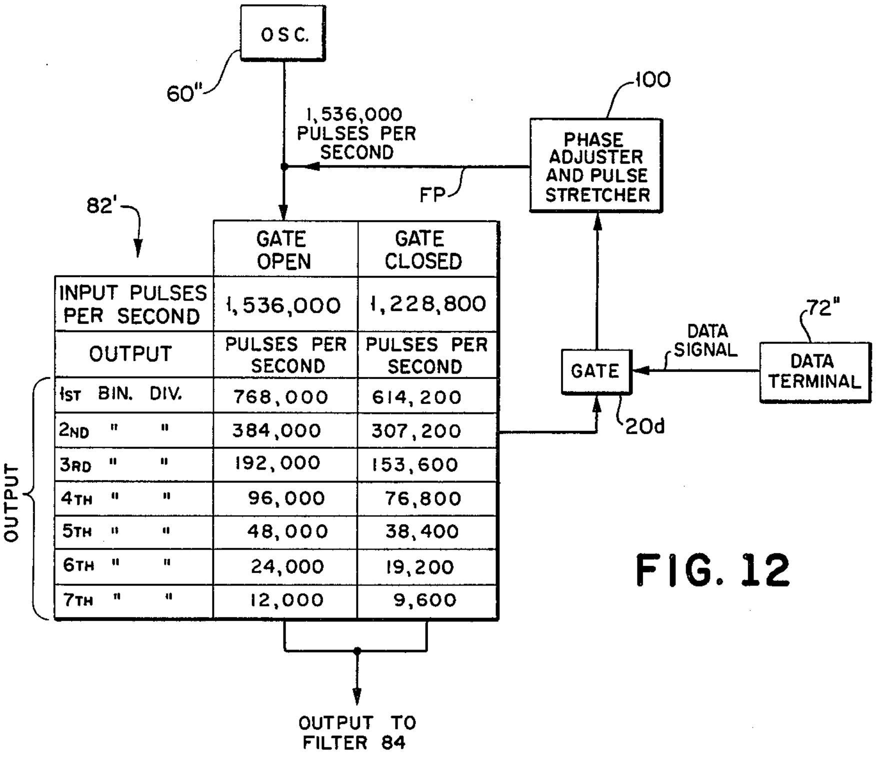
FIG. 12 is a diagram of a feedback chain according to the invention.

Such a chain of seven binary dividers is illustrated in FIG. 12. This chain 82' may replace chain 82 in system 10c of FIG. 9. An input frequency to the chain 82' is applied from crystal oscillator 60'' of 1,536,000 p.p.s. There is shown a feedback path FP containing a gate 20d controlled by the data signal from data terminal 72'' and suitable phase adjuster or delay circuit 100. If required a pulse stretching circuit is added to the delay circuit. The feedback circuit FP goes from the output of the second binary divider circuit in chain 82' back to the input of the first binary divider. This feedback path is of the subtractive type described earlier, that is, each time a pulse comes out of the second stage of the divider it subtracts one from the train of applied pulses. Thus if the gate 20d in the feedback path is in a nonconducting condition, the first two stages of the FSK signal forming chain will put out one pulse for each four applied but if the gate is conducting the next pulse after each turnover of the second stage of the divider will be nullified and five pulses will have to be applied by the crystal oscillator for each one delivered at the output of the second stage of division. Thus the crystal oscillator frequency will be divided by either four or five depending upon whether the gate is open or closed and the output frequency of the second divider will consequently be either 384,000 pulses per second or 307,200 pulses per second. From here on operation will be as described for system 10c of FIG. 9. The needed frequencies for operation of the modulator 70' and timing of the data terminal 72'' if required may be obtained by methods already described. The signal frequency of 1,536,000 cycles per second divides down to 3000 cyles per second. The third harmonic of 3000 cycles per second, i.e., 9000 cycles per second, can be selected for operation of modulator 70'. A signal of 2400 cycles per second also appears in the series at the sixth divider in chain 82' when the gate is open. This output from a similar independent divider may be further divided by a feedback divider arranged to divide by 10 to give 2400 cycles per second if required.

Figure 13:
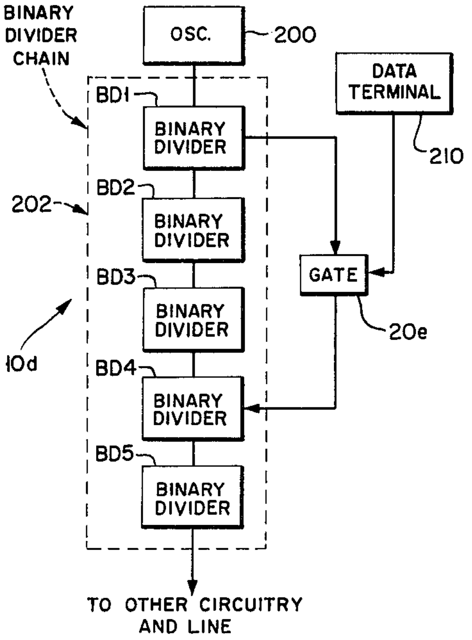
Figure 15:
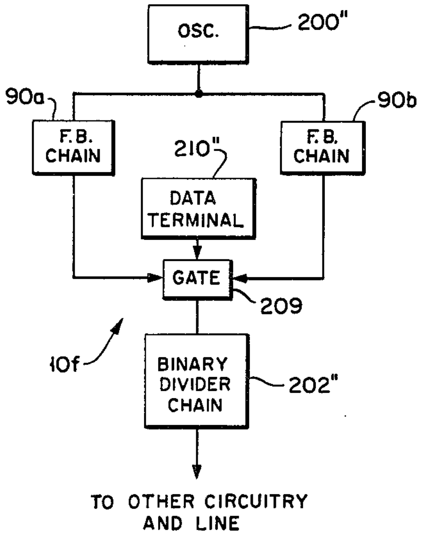
Figure 14:
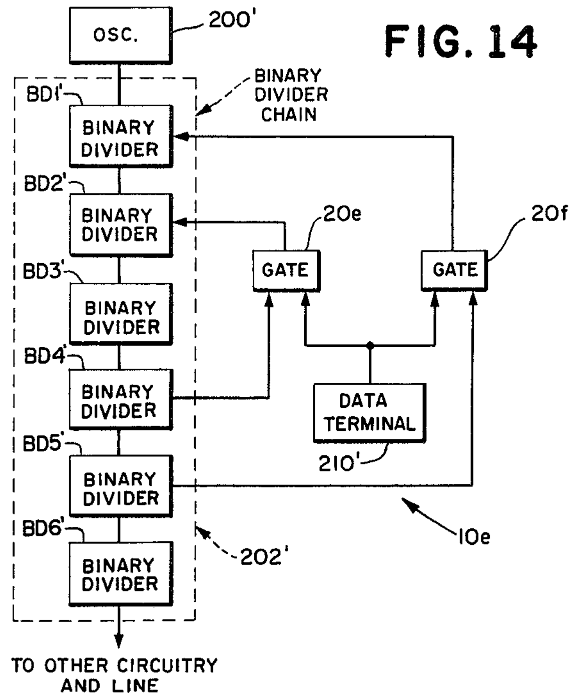

In FIGS. 13, 14 and 15 are shown diagrammatically three further systems 10d, 10e and 10f respectively which are modifications of the system 10a of FIG. 6.

System 10d employs oscillator 200 which is a source of a single fixed frequency. Binary divider chain 202 has a series of frequency dividers BD1–BD5 driven by the oscillator 200. A data terminal 210 is connected to one input of gate 20*e* to open and close the gate. Binary divider BD1 applies a fraction of the frequency of oscillator 200 to the gate, and the gate applies this frequency to divider BD4. The output of divider BD4 is applied to divider BD5. When the gate 20*e* is nonconducting divider BD4 is driven by divider BD3 alone. Thus divider BD5 has a lower output frequency when gate 20*e* is nonconducting then when it is conducting.

System 10*e* of FIG. 14 is similar to system 10*d* except that data terminal 210′ applies a keying signal to inputs of two gates 20*f* and 20*g* to open and close them alternatively, or together as the system may require to obtain the desired frequencies. The binary divider 202′ has dividers BD1′–BD6′. Oscillator 200′ is connected to the input of divider BD1′. The output of the gate 20*f* is applied to divider BD1′. The output of gate 20*e* is applied to divider BR2′. Gate 20*e* derives another input from divider BD4′. Gate 20*f* derives another input from divider BD5′. In this arrangement the gates 20*e* and 20*f* may open alternately under control of data terminal 210′. When gate 20*e* is open, it applies signal of divider BD4′ to divider BD2′ to obtain one resulting frequency for application to divider BD5′ from divider BD4′. When gate 20*f* is open it applies the signal of divider BD5′ to divider BD1′ to obtain a different output frequency from this divider than is produced from this divider when gate 20*e* is open. It is also possible to arrange the gates 20, 20*f* so that both open and close together to produce the desired output frequencies.

System 10*f* of FIG. 15, has the oscillator 200″ producing a single fixed frequency connected to two feedback divider chains 90*a* and 90*b* each arranged to give a required frequency. The different frequency outputs of the feedback divider chains are applied to gate 20*g*. Data terminal 210″ applies a low frequency input signal to the gate to key it. The gate passes the outputs of chains 90*a*, 90*b* alternately to the binary divider chain 202″. System 10*f* thus illustrates a means for deriving the required two output frequencies by using a single oscillator and two feedback divider chains in contrast to the system 10*a* of FIG. 6 where two sources of signal frequencies are required.

Figure 7:
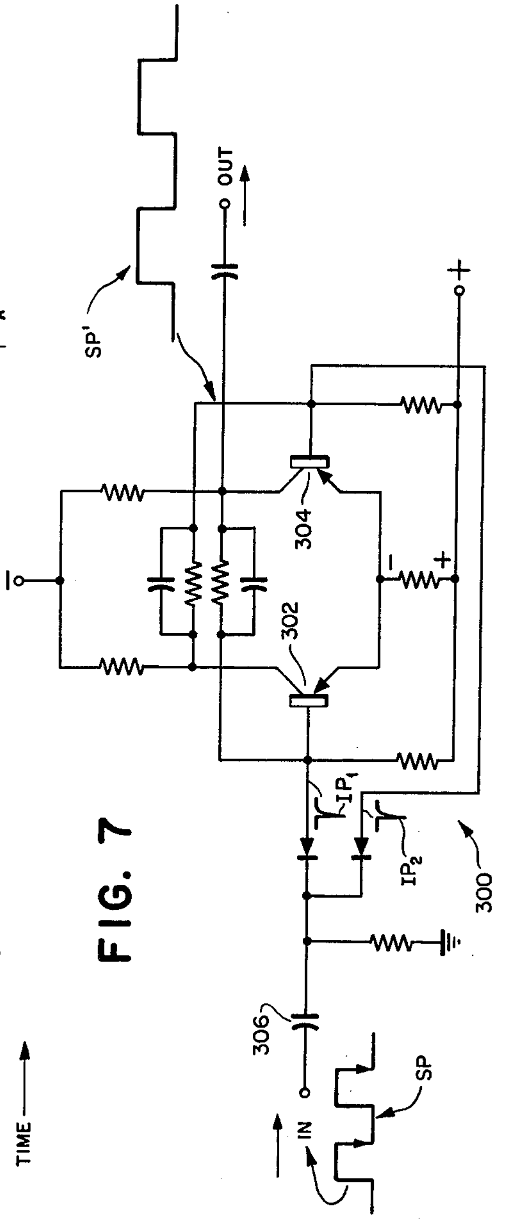
FIG. 7 is a diagram of a binary divider circuit.

The binary divider circuit 300 shown in FIG. 7 may be used in any of the systems described above. The circuit has two transistors 302, 304 to the bases of which are applied differentiated, peaked pulses IP1 and IP2 derived from square wave input pulses SP via capacitor 306. The square pulses have a predetermined pulse repetition rate. The transistors are normally one non-conducting and the other conducting when connected in this circuit configuration. Upon the application of each pulse IP1 and IP2, the non-conducting transistor is rendered conducting and the conducting transistor is rendered non-conducting. Thus the output of the divider is a square wave SP′, or a series of pulses depending upon the output connections used whose repetition rate is one-half of the rate of input pulses SP.

What is claimed is:

1. A system for producing frequency shift keying signals, comprising a source of signals of a single frequency, a first binary divider chain connected to said source to produce a first group of signals of lower frequencies than said single frequency, a keying signal source, a gate connected to the keying signal source and keyed thereby, said gate having inputs connected in circuit to the first chain for passing therethrough two selected signals derived from said group, a second binary divider chain connected to an output of the gate for deriving further signals of frequencies lower than said two selected signals, a filter connected to said second chain for converting said further signals to sine waveform, a carrier signal source, a heterodyning modulator connected in circuit with said carrier signal source and said filter for producing sidebands containing frequency shift keying signals at desired line frequencies, wherein said carrier signal source comprises a third binary divider chain connected to the first chain for deriving a certain one of said group of signals and for producing a certain carrier signal therefrom, and means connecting the third chain to the modulator for applying said carrier signal thereto.

2. A system according to claim 1, further comprising means connecting said keying signal source to said first chain to derive timing signals therefrom.

3. A system for producing frequency shift keying signals, comprising a source of signals of a single frequency, a first binary divider chain connected to said source to produce a first group of signals of lower frequencies than said single frequency, a data signal source, a gate connected to the data signal source and keyed thereby to open and closed conditions alternately, said gate having an input connected to one divider in said chain to apply one signal of one of the lower frequencies to the gate, said gate having an output to pass said one signal, a second binary dividing chain connected to the output of the gate and to said source of signals of a single frequency to produce a second group of signals which will be of higher frequency than when the gate is conducting than when the gate is nonconducting, a filter connected to the second chain to reduce the output of this chain to sine waveform, a third binary dividing chain connected to certain dividers in the first binary divider chain for obtaining a certain signal frequency therefrom and for producing a third group of signals, a heterodyning modulator connected to the filter and to a divider in the third chain for producing two different frequency shift keying signals as the gate is keyed by the keying signal source, and a filter connected to the modulator to select desired frequencies as frequency shift keying signal frequencies for transmission.

4. A system according to claim 3, further comprising circuit means connecting a divider of the first binary divider chain to the data signal source to apply timing signals thereto for synchronous operation of the data signal source with respect to said source of single frequency.

5. A system according to claim 3, further comprising pulse delay and pulse stretching means connected between another divider in the first chain and the fourth chain to reduce the frequency of the signal obtained from said certain divider by a predetermined amount prior to binary division in the third chain.

6. A system according to claim 5, further comprising circuit means connecting a divider of one of the binary divider chains to the data signal source to apply timing signals thereto for synchronous operation of the data signal source with respect to said source of single frequency.

7. A system for producing frequency shift keying signals, comprising a first source of signals of single frequency, a gate, a keying signal source connected to said gate to key the same to two alternate signal passing conditions, said gate having two input terminals, a first divider chain connected between the first signal source and one gate input to apply signals of one frequency thereto, a second divider chain connected between the first signal source and the other gate input to apply signals of another frequency thereto, and a third divider chain for producing groups of different signal frequencies, said gate having an output connected to the third chain, whereby the third chain produces one group of signal frequencies when the gate passes signals from the first divider chain, and produces another group of signal frequencies when the gate passes signals from the second divider chain.

References Cited by the Examiner

UNITED STATES PATENTS

| | | | |
|---|---|---|---|
| 3,031,527 | 4/62 | Barton et al. | 325—163 |
| 3,102,238 | 8/63 | Bosen | 178—66 |
| 3,121,197 | 2/64 | Irland | 178—66 |

DAVID G. REDINBAUGH, *Primary Examiner.*